United States Patent [19]

Cooper, Jr.

[11] 4,368,571

[45] Jan. 18, 1983

[54] SLEEVING METHOD

[75] Inventor: Frank W. Cooper, Jr., Monroeville, Pa.

[73] Assignee: Westinghouse Electric Corp., Pittsburgh, Pa.

[21] Appl. No.: 185,656

[22] Filed: Sep. 9, 1980

[51] Int. Cl.$^3$ .............................................. B23P 17/00
[52] U.S. Cl. ............................. 29/421 R; 29/157.3 R; 29/523
[58] Field of Search ........... 29/421 R, 153.3 C, 157.4, 29/523; 72/62

[56] References Cited

U.S. PATENT DOCUMENTS

| | | | |
|---|---|---|---|
| 2,460,580 | 2/1949 | Huber | 29/421 R |
| 3,018,547 | 1/1962 | Marskell | 29/523 X |
| 3,434,194 | 3/1969 | Whittaker et al. | 29/523 |
| 3,897,619 | 8/1975 | Thivaris | 29/421 R |
| 3,977,068 | 8/1976 | Krips | 29/421 R |
| 4,069,573 | 1/1978 | Rogers, Jr. et al. | 29/421 R |

Primary Examiner—Leon Gilden
Attorney, Agent, or Firm—L. A. DePaul

[57] ABSTRACT

The sleeving method comprises inserting a metal sleeve within a tube so as to bridge the defective region of the tube. The sleeve is constructed to have teeth on the outside thereof that are capable of tightly contacting the inside surface of the defective tube and creating a labyrinth-type seal therebetween. Once such a sleeve has been inserted into the defective tube, the sleeve is internally expanded in the area of the sleeve wherein the teeth are located. The expansion of the sleeve in the area wherein the teeth are located causes the teeth to closely contact the inside surface of the tube. The other end of the sleeve can then be either similarly attached to the tube or welded to the tube. Next, the remainder of the sleeve is internally expanded which causes the sleeve to shrink in length which results in the teeth slightly penetrating the inside surface of the tube thereby creating a leak tight seal therebetween.

11 Claims, 5 Drawing Figures

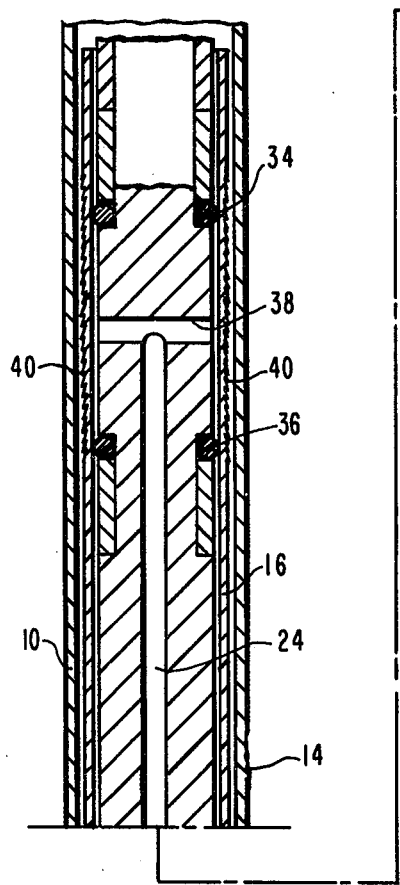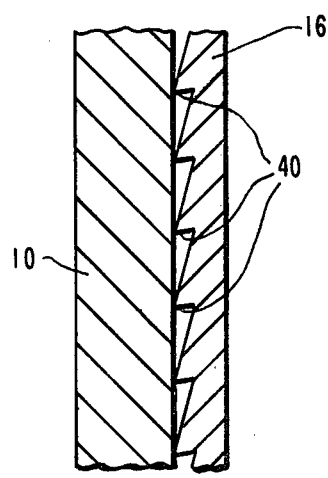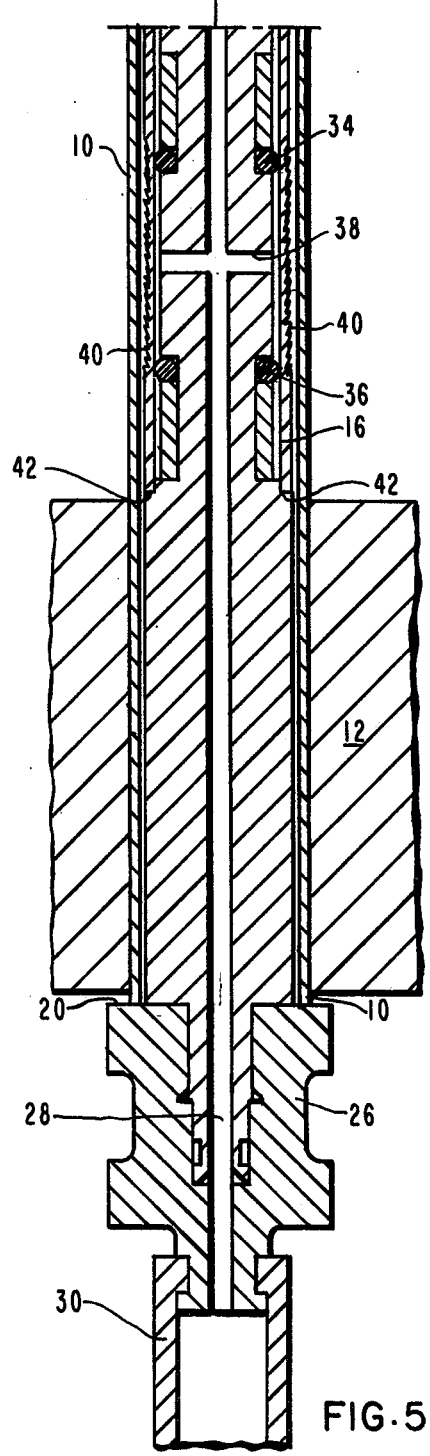
FIG. 2
FIG. 5

SLEEVING METHOD

CROSS-REFERENCE TO RELATED APPLICATIONS

This application is related to copending application Ser. No. 185,645 filed herewith, in the name of R. D. Burack and entitled "Braze Sleeving Method" which is assigned to the Westinghouse Electric Corporation.

BACKGROUND OF THE INVENTION

This invention relates to tube repair methods and more particularly to methods for attaching a sleeve within a tube.

In tube type heat exchangers, a first fluid flows through the tubes of the heat exchanger while a second fluid surrounds the outside of the tubes such that heat exchange occurs between the two fluids. Occasionally, one of the tubes can become defective such that a leak occurs therein which allows the fluids to mingle. When this occurs, it is sometimes necessary to plug the tube so that the fluid does not flow through the tube, thereby preventing leakage from the tube.

In nuclear reactor power plants, the tube type heat exchangers are commonly referred to as steam generators. When a defect occurs in the tubes of a nuclear steam generator that allows the coolant in the tubes to mingle with the coolant outside of the tubes, a more significant problem arises. Not only does this situation create an ineffective heat exchanger, but it also creates a radioactive contamination problem. Since the fluid flowing in the tubes of a nuclear steam generator is generally radioactive, it is important that it not be allowed to leak from the tubes and contaminate the fluid surrounding the tubes. Therefore, when a leak occurs in a nuclear steam generator heat exchange tube, the heat exchange tube must be either plugged or repaired so that the coolant does not leak from the tube. This prevents contamination of the fluid surrounding the tubes.

There are several methods known in the art for repairing heat exchange tubes, however, many of these methods are not applicable to repair of heat exchange tubes wherein the tube is not readily accessible. For example, in a nuclear steam generator the physical inaccessibility of defective heat exchange tubes and the radioactive nature of the environment surrounding the heat exchange tubes presents unique problems to repairing heat exchange tubes that do not normally exist in other heat exchangers. For these reasons, special methods have been developed for repairing heat exchange tubes in nuclear steam generators. Typically, the method used to repair a heat exchange tube in a nuclear steam generator is one in which a metal sleeve having an outside diameter slightly smaller than the inside diameter of the defective tube is inserted into the defective tube and attached to the defective tube to bridge the defective area of the tube. This type of repair method is generally referred to as "sleeving". Previous sleeving development work has been concerned with obtaining a relatively leakproof joint between the sleeve and the tube by brazing, arc welding, explosive welding, or other joining means. Due to the need for cleanliness, close fittings, heat application, and atmospheric control, these metallurgical bonding techniques have problems which are not easily solvable in areas such as a nuclear steam generator where human access is limited.

One particular method of securing a sleeve within a tube is described in U.S. Pat. No. 4,069,573, issued Jan. 24, 1978 to Rogers, Jr. et al. In the patent to Rogers, Jr. et al., the sleeve is positioned within the tube so that it extends coextensive with the region of degraded tube wall and partially beyond the axial extremes of the degraded area. A radially outwardly directed force is then applied to the tubular sleeve from within along a portion of the sleeve at each end, extending beyond the degraded area. The force is sufficient to cause outward plastic deformation of both the sleeve and the tube resulting in an interference mechanical joint therebetween. As stated in the patent to Rogers, Jr. et al., the method as described therein does not produce a leak tight joint.

While there are methods known in the art for inserting sleeves within tubes of heat exchangers, there do not exist methods for inserting sleeves in nuclear steam generator heat exchange tubes which are capable of being performed where personnel access is limited and wherein a relatively leak tight joint is established. Therefore, what is needed is a method for securing a sleeve within a heat exchange tube of a nuclear steam generator that produces a relatively leak tight joint between the sleeve and the tube so that no leakage occurs from the tube in the defective region.

SUMMARY OF THE INVENTION

The sleeving method comprises inserting a metal sleeve within a tube so as to bridge the defective region of the tube. The sleeve is constructed to have teeth on the outside thereof that are capable of tightly contacting the inside surface of the defective tube and creating a labyrinth-type seal therebetween. Once such a sleeve has been inserted into the defective tube, the sleeve is internally expanded in the area of the sleeve wherein the teeth are located. The expansion of the sleeve in the area wherein the teeth are located causes the teeth to closely contact the inside surface of the tube. The other end of the sleeve can then be either similarly attached to the tube or welded to the tube. Next, the remainder of the sleeve is internally expanded which causes the sleeve to shrink in length which results in the teeth slightly penetrating the inside surface of the tube thereby creating a leak tight seal therebetween.

BRIEF DESCRIPTION OF THE DRAWINGS

While the specification concludes with claims particularly pointing and distinctly claiming the subject matter of the invention, it is believed the invention will be better understoood from the following description, taken in conjunction with the accompanying drawings, wherein:

FIG. 2 is an enlarged view of the sleeve and tube showing the teeth of the sleeve;

FIG. 5 is a cross-sectional view in elevation of the sleeving apparatus used to position the sleeve in the area of a tube away from the tubesheet.

DESCRIPTION OF THE PREFERRED EMBODIMENT

When a heat exchange tube in a nuclear steam generator becomes defective, it becomes necessary to either plug the heat exchange tube or to repair the defective area. The invention described herein provides a method for repairing the defective area in a heat exchange tube in a nuclear steam generator by bridging the defective area with a metal sleeve.

Figure 1:
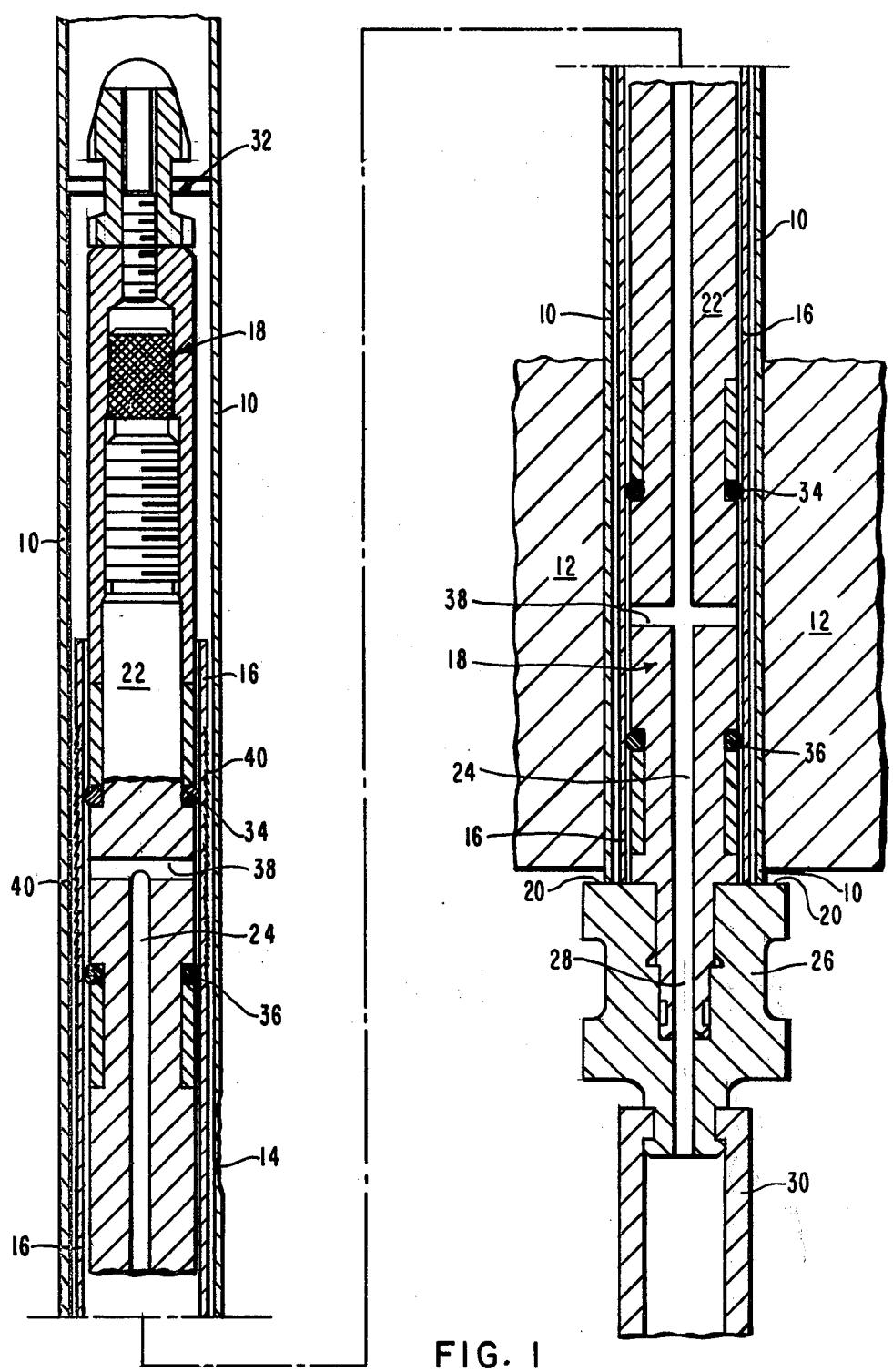
FIG. 1 is a cross-sectional view in elevation of a sleeve and expander apparatus disposed within a heat exchange tube.

Referring now to FIG. 1, the nuclear steam generator (not shown) comprises a plurality of heat exchange tubes 10 which may be U-shaped tubes and are attached at each end to a tubesheet 12. During operation of the nuclear steam generator, reactor coolant flows through the heat exchange tubes 10 in a manner so as to heat fluid surrounding the tubes 10. The fluid around the tubes 10 is converted to steam to produce electricity in a conventional manner. Since the reactor coolant flowing through heat exchange tubes 10 has passed through the nuclear reactor, it is radioactive. Therefore, it is important to isolate the coolant flowing through the tubes from the fluid surrounding the tubes. When a defect develops in heat exchange tube 10 such as defect 14, it is necessary to either plug heat exchange tube 10 or repair the area surrounding defect 14 so that no coolant leaks through defect 14. One method of repairing defect 14 is by inserting a metal sleeve 16 into heat exchange tube 10 in a manner so as to bridge the defective area.

Still referring to FIG. 1, when it is necessary to repair a defect such as defect 14, the nuclear steam generator is drained of its coolant and deactivated so that the end of a tube 10 can be reached by either remote access manipulators or by working personnel. Then a sleeve 16, which may be an Inconel sleeve, is positioned over an expander 18 which may be an hydraulic expander chosen from those well-known in the art. Sleeve 16 is positioned on expander 18 such that one end of sleeve 16 is placed on ledge 20 of expander 18. Expander 18 with sleeve 16 mounted thereon is then inserted into tube 10 as shown in FIG. 1. Ledge 20 of expander 18 is brought into contact with the bottom end of tube 10 so that the bottom end of sleeve 16 and the bottom end of tube 10 are in alignment. This provides an indexing point from which operators can determine the location of the top and bottom ends of sleeve 16.

Still referring to FIG. 1, expander 18 comprises a central metal member 22 having a bore 24 therein for passage of a fluid therethrough. Central member 22 is attached at its lower end to end piece 26 whereon ledge 20 is located. End piece 26 also has a second bore 28 therein which is in colinear alignment with first bore 24. A flexible fluid conduit 30 may be attached to the lower end of end piece 26 for conducting a fluid through second bore 28 and into first bore 24. A guide mechanism 32 is attached to the top end of central member 22 for positioning expander 18 centrally within tube 10. Guide member 32 may be annular plastic strips attached to central member 22 or may be brush-like members for maintaining central member 22 in a proper relationship within tube 10 while allowing guide member 32 to pass through constricted portions of tube 10. A set of first seals 34 and a set of second seals 36 are disposed on central member 22 so as to define an annular area wherein sleeve 16 is to be expanded. The seals may comprise a rubber O-ring and a urethane back-up ring chosen from those well known in the art. The seals are arranged to tightly contact the inside surface of sleeve 16. A transverse bore 38 is also provided in central member 22 and in fluid communication with first bore 24 for conducting a fluid from first bore 24 to the annular area defined between first seals 34 and second seals 36 for expanding sleeve 16 into contact with tube 10. A second set of first seals 34 and a second set of second seals 36 may also be employed to expand sleeve 16 in more than one location.

Referring now to FIGS. 1 and 2, sleeve 16 has a set of annular grooves or teeth 40 located on the outside surface of sleeve 16 for gripping the inside surface of tube 10. As shown in FIG. 1, teeth 40 are located near the end of sleeve 16 and are directed toward the center of sleeve 16.

Figure 3:
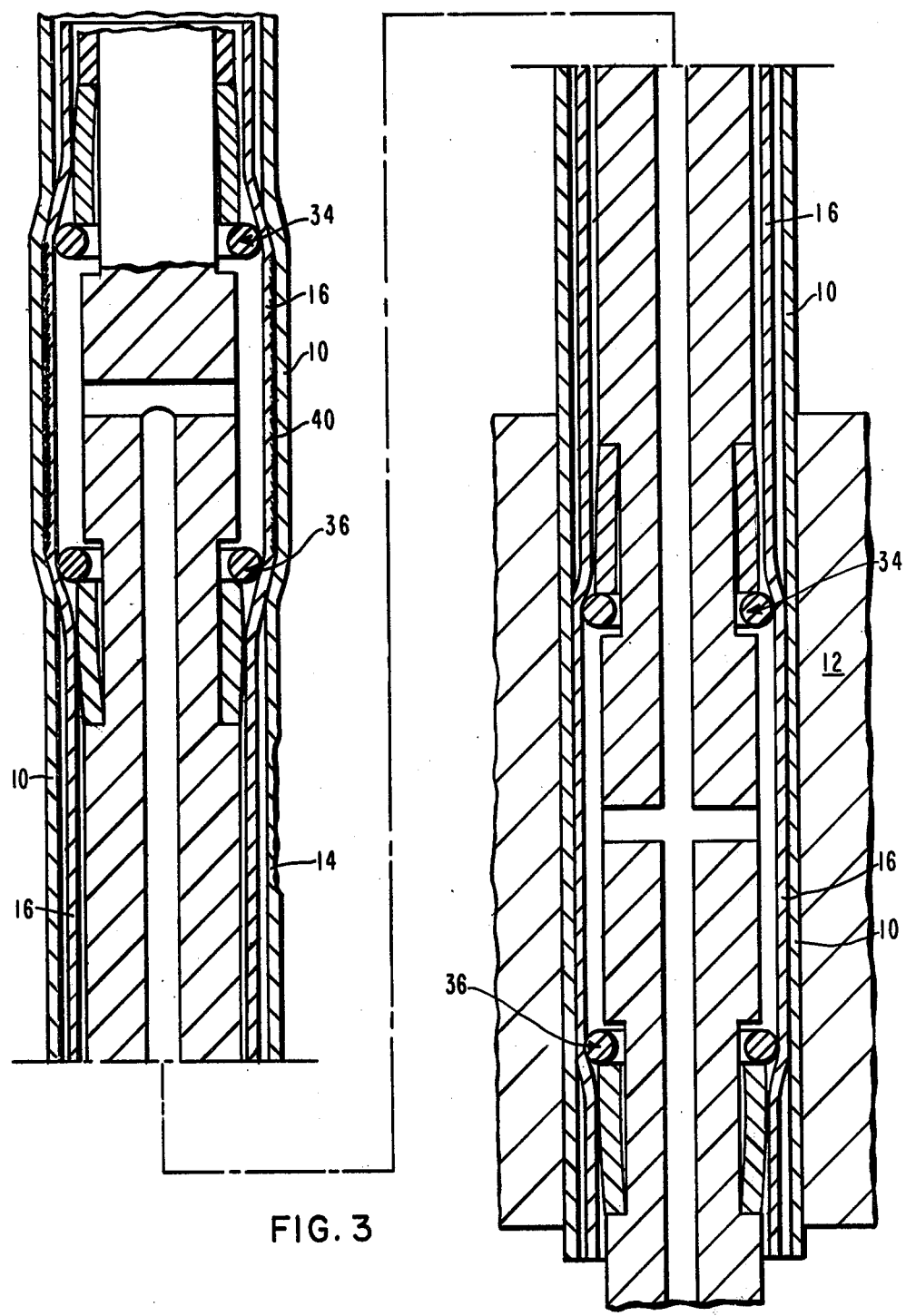
FIG. 3 is a cross-sectional view in elevation of the sleeve in the expanded position.
Figure 4:
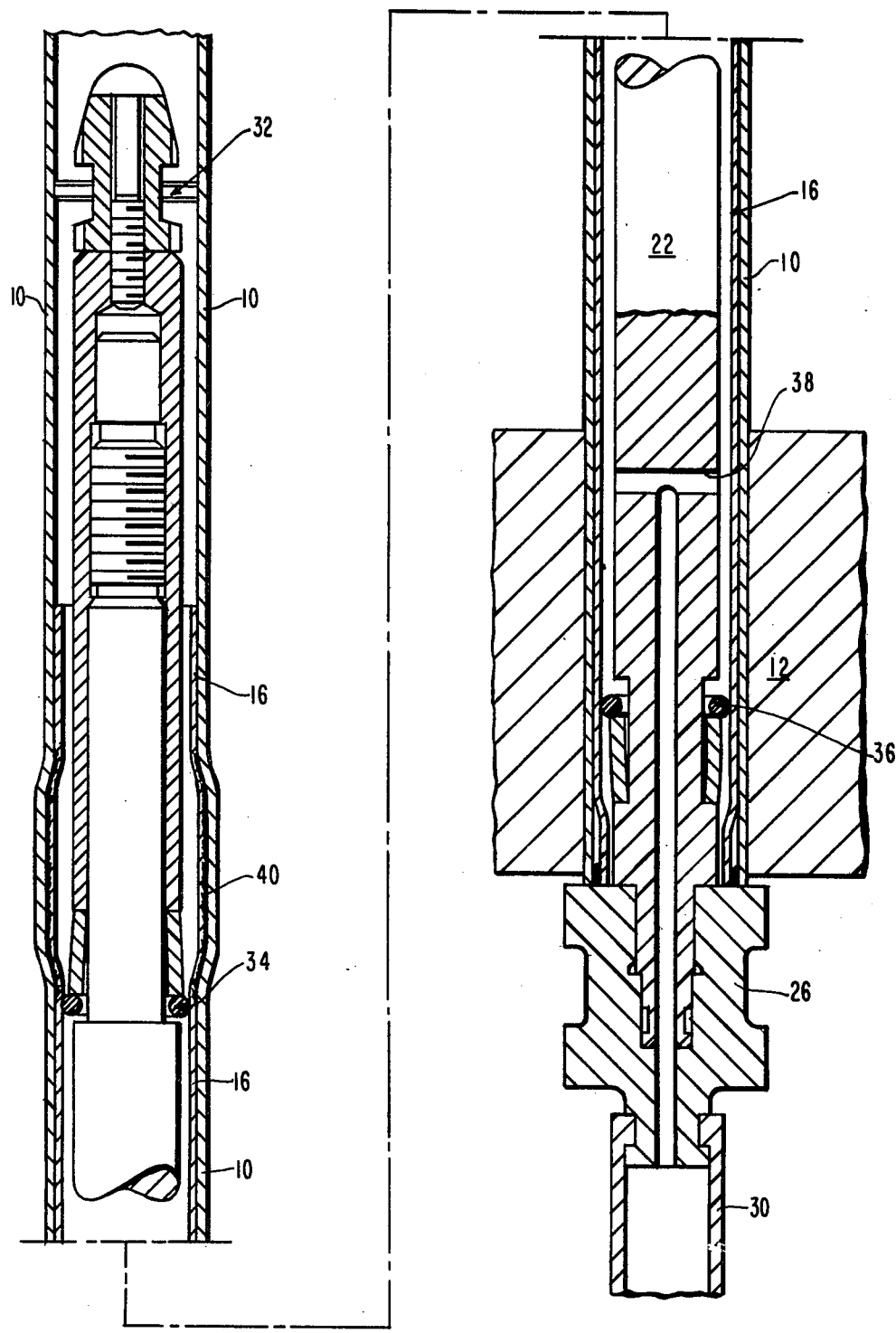
FIG. 4 is a cross-sectional view in elevation of the full depth expansion of the sleeve.

Once sleeve 16 and expander 18 have been positioned in tube 10 as shown in FIG. 1, a fluid such as water is introduced from a fluid source (not shown) through fluid conduit 30 at a pressure of between approximately 15,000 and 25,000 psia. The fluid flows through second bore 28, through first bore 24, and through transverse bore 38. From transverse bore 38 the fluid enters the annular chamber defined between first seals 34 and second seals 36. The fluid pressure causes sleeve 16 to expand into contact with and also expand tube 10 as shown in FIG. 3. The expansion causes permanent plastic deformation of both tube 10 and sleeve 16 so that sleeve 16 is in close contact with tube 10. The expansion of both sleeve 16 and tube 10 causes teeth 40 to be in close contact with the inside surface of tube 10. In this manner, sleeve 16 is positioned firmly within tube 10 but is not yet completely sealed. A portion of sleeve 16 near the lower end of sleeve 16 is also expanded into contact with tube 10 as shown in FIG. 3. This may be accomplished in one step, as shown in FIG. 3 or in two separate steps. Next, the expander is removed from tube 10 and the lower end of sleeve 16 is welded to the lower end of tube 10 by tungsten inert gas welding as shown in FIG. 4. It should be noted that since both the lower end of sleeve 16 and the lower end of tube 10 have greater accessibility than does the upper section of sleeve 16, these lower ends can be welded by conventional methods. The expansion of the lower end of sleeve 16 into contact with tube 10 is performed to increase the contact between sleeve 16 and tube 10 in that area and to enhance the weldability of sleeve 16 and tube 10 in that area. It should be further noted that since the end of sleeve 16 and tube 10 are capable of being welded, it is not necessary to have teeth 40 in that section of sleeve 16.

Next, referring to FIG. 4, an expander member that is similar to the one previously described is inserted into sleeve 16 and tube 10 as shown. However, the seals in this expander are located so that the entire sleeve 16 may be expanded. Fluid is then introduced into the annular space between the expander member and sleeve 16 at a pressure between approximately 8,000 and 12,00 psia for a period of 5–10 seconds. This causes the remainder of sleeve 16 to be expanded into contact with tube 10 without further deforming tube 10. Thus, sleeve 16 is placed in contact with tube 10 without causing further expansion of tube 10. This is referred to generally as a full depth expansion. The full depth expansion causes a slight shortening of the length of sleeve 16 which further causes teeth 40 to grab into tube 10. The shortening of sleeve 16 by the expansion process creates a leak tight seal between teeth 40 and tube 10. Since there are a plurality of teeth 40, the seal created between teeth 40 and tube 10 is a type of labyrinth seal. It should be noted that since the bottom end of sleeve 16 is welded to tube 10, only the top end of sleeve 16 tends to move downwardly. In this manner, a metal sleeve may be inserted into and sealed to a tube in a nuclear steam generator in a leak tight fashion. This allows the heat exchange tube to be used in a radioactive environment without leaking contaminants through defect 14.

The method previously described is preferably used where the bottom end of sleeve 16 may be welded to tube 10. However, where the defect 14 is located in an area far removed from tubesheet 12, the apparatus as shown in FIG. 5 may be employed. The apparatus as shown in FIG. 5 is substantially similar to the apparatus previously described except that a shoulder 42 is notched in central member 22 for positioning sleeve 16 at a remote location in tube 10.

Still referring to FIG. 5, when defect 14 is located far removed from tubesheet 12, the following procedure may be employed. First, a sleeve 16 having teeth 40 on the top end and teeth 40 on the bottom end is disposed over expander member 18 such that the bottom end of sleeve 16 rests on shoulder 42. Then, sleeve 16 and expander member 18 are inserted into tube 10 as shown in FIG. 5. Expander member 18 is designed such that when the bottom end of tube 10 contacts ledge 20, sleeve 16 will have spanned defect 14. Next, the top portion of sleeve 16 wherein teeth 40 are located is expanded into contact with tube 10 and will result in a configuration as shown in FIG. 3. With sleeve 16 in a configuration as shown in FIG. 3, expander member 18 may be removed leaving sleeve 16 in its appropriate longitudinal location within tube 10. Once this has been performed, sleeve 16 will be disposed in tube 10 and have both areas wherein teeth are located expanded into contact with the tube but without having the remainder of the sleeve expanded. Then another expander member is inserted into sleeve 16 and tube 10 to achieve a full depth expansion of sleeve 16. As described above, the full depth expansion of sleeve 16 not only causes the remainder of sleeve 16 to be moved into close contact with tube 10, it also causes a slight shrinking of the length of sleeve 16 which causes both portions of sleeve 16 wherein teeth 40 are located to grab more firmly into tube 10. This shortening of sleeve 16 and the grabbing of the teeth into tube 10 creates a leak tight bond between teeth 40 and tube 10 at both locations. It should be noted that the order in which each end of sleeve 16 is attached to tube 10 is generally immaterial. Therefore, whether the top or bottom end of sleeve 16 is first attached to tube 10 depends upon the particular circumstances. In this manner, a sleeve 16 may be inserted into a tube 10 at a location far removed from the tubesheet 12 and without the necessity of welding either end of the tube.

Therefore, it can be seen that the invention provides a method for inserting a sleeve into a heat transfer tube and establishing a leak tight bond therebetween.

I claim as my invention:

1. A method of securing a metal sleeve within a metal tube comprising:
    positioning in said tube a metal sleeve having annular grooves around a portion of the outside surface thereof;
    internally expanding the portion of said sleeve wherein said grooves are located thereby securing one end of said sleeve to said tube;
    securing the other end of said sleeve to said tube; and
    internally expanding the remainder of said sleeve into contact with said tube whereby said sleeve tends to shrink axially causing said sleeve to closely contact said tube establishing a substantially leak tight joint between said sleeve and said tube.

2. The method according to claim 1 wherein said step of securing said other end of said sleeve to said tube comprises internally expanding said other end of said tube wherein said annular grooves are located thereby securing said other end of said sleeve to said tube.

3. The method according to claim 2 wherein said annular grooves are a plurality of teeth arranged to be impressed into said tube.

4. The method according to claim 3 wherein said teeth are arranged around a portion of the outside surface of said sleeve in successive rows.

5. The method according to claim 4 wherein said teeth are directed outwardly toward said tube and angled toward the center of said sleeve.

6. The method according to claim 5 wherein said sleeve is expanded under a pressure between approximately 15,000 and 25,000 psia.

7. The method according to claim 1 wherein said step of securing said other end of said sleeve to said tube comprises welding said sleeve to said tube.

8. The method according to claim 7 wherein said annular grooves are a plurality of teeth arranged to be impressed into said tube.

9. The method according to claim 8 wherein said teeth are arranged around a portion of the outside surface of said sleeve in successive rows.

10. The method according to claim 9 wherein said teeth are directed outwardly toward said tube and angled toward the center of said sleeve.

11. The method according to claim 10 wherein said sleeve is expanded under a pressure between approximately 15,000 and 25,000 psia.

* * * * *